United States Patent
Kwak (10) Patent No.: US 10,351,792 B2
(45) Date of Patent: Jul. 16, 2019

(54) POLY (METH)ACRYLATE WITH IMPROVED VISCOSITY INDEX FOR LUBRICANT ADDITIVE APPLICATION

(71) Applicant: Afton Chemical Corporation, Richmond, VA (US)

(72) Inventor: Yungwan Kwak, Glen Allen, VA (US)

(73) Assignee: Afton Chemical Corporation, Richmond, VA (US)

(*) Notice: Subject to any disclaimer, the term of this patent is extended or adjusted under 35 U.S.C. 154(b) by 0 days.

(21) Appl. No.: 15/590,075

(22) Filed: May 9, 2017

(65) Prior Publication Data
US 2018/0327687 A1    Nov. 15, 2018

(51) Int. Cl.
| | | |
|---|---|---|
| *C10L 1/14* | (2006.01) | |
| *C10M 145/20* | (2006.01) | |
| *C08F 220/18* | (2006.01) | |
| *C10M 145/14* | (2006.01) | |

(52) U.S. Cl.
CPC ......... *C10M 145/20* (2013.01); *C08F 220/18* (2013.01); *C10M 145/14* (2013.01); *C08F 2438/03* (2013.01); *C10M 2209/084* (2013.01); *C10M 2215/28* (2013.01); *C10M 2219/024* (2013.01); *C10N 2210/02* (2013.01); *C10N 2220/021* (2013.01); *C10N 2220/022* (2013.01); *C10N 2230/02* (2013.01); *C10N 2230/06* (2013.01)

(58) Field of Classification Search
CPC .......... C10M 145/14; C10M 2209/084; C10M 2209/086
USPC ....................................................... 508/459
See application file for complete search history.

(56) References Cited

U.S. PATENT DOCUMENTS

| | | |
|---|---|---|
| 3,364,182 A | 1/1968 | McDonald |
| 5,079,298 A | 1/1992 | Kuriyama et al. |
| 5,468,477 A | 11/1995 | Kumar et al. |
| 5,869,598 A | 2/1999 | Yoshida et al. |
| 6,013,735 A | 1/2000 | Mishra et al. |
| 6,201,099 B1 | 3/2001 | Petersen et al. |
| 6,433,028 B1 | 8/2002 | Ebbrecht et al. |
| 7,049,273 B2 | 5/2006 | Esche, Jr. et al. |

(Continued)

FOREIGN PATENT DOCUMENTS

| | | | |
|---|---|---|---|
| EP | 0436872 A2 | 7/1991 | |
| EP | 0569639 A1 | 11/1993 | |

(Continued)

OTHER PUBLICATIONS

Chisholm, M. S., et al., "Facile and cost-effective branched acrylic copolymers from multifunctional comonomers and multifunctional chain transfer agents," Polymer Chemistry, 2015, 6, 7333-7341.

(Continued)

*Primary Examiner* — Prem C Singh
*Assistant Examiner* — Francis C Campanell
(74) *Attorney, Agent, or Firm* — Honigman LLP (57) ABSTRACT

The present disclosure relates to polymers suitable for viscosity index improvers in lubricating oil compositions and further relates to oil compositions comprising such polymers. The disclosure also relates to polymer compositions derived from alkyl (meth)acrylate monomers and selected molar ratios of the (meth)acrylate monomers in the polymer suitable to use as viscosity modifiers.

24 Claims, 1 Drawing Sheet

(56) References Cited

U.S. PATENT DOCUMENTS

| | | |
|---|---|---|
| 7,407,918 B2 | 8/2008 | Mishra et al. |
| 8,299,002 B2 | 10/2012 | Glasgow et al. |
| 8,778,857 B2 | 7/2014 | Growcott |
| 8,835,367 B2 | 9/2014 | Baum et al. |
| 9,340,747 B2 | 5/2016 | Nakao et al. |
| 9,469,825 B2 | 10/2016 | Tang |
| 2003/0032727 A1 | 2/2003 | Narayan-Sarathy et al. |
| 2004/0077509 A1 | 4/2004 | Tsuyoshi et al. |
| 2004/0209784 A1 | 10/2004 | Hardman et al. |
| 2007/0244018 A1 | 10/2007 | Visger et al. |
| 2010/0167970 A1 | 7/2010 | Stoehr et al. |
| 2012/0152479 A1 | 6/2012 | Kondou |
| 2013/0079265 A1* | 3/2013 | Eisenberg ............ C08F 120/18 508/500 |
| 2013/0229016 A1* | 9/2013 | Ghahary ................ F03D 9/257 290/55 |
| 2013/0310291 A1 | 11/2013 | Marina et al. |
| 2015/0183915 A1 | 7/2015 | Johnson et al. |
| 2015/0275130 A1 | 10/2015 | Malcom et al. |
| 2015/0322366 A1 | 11/2015 | Santucci-Aribert et al. |
| 2017/0233675 A1 | 8/2017 | Ugamura et al. |

FOREIGN PATENT DOCUMENTS

| | | |
|---|---|---|
| EP | 0639969 A1 | 3/1995 |
| EP | 2792733 A1 | 10/2014 |
| EP | 3272842 A1 | 1/2018 |
| FR | 1422755 A | 12/1965 |
| JP | H07179538 | 7/1995 |
| JP | 2000313864 | 11/2000 |
| JP | 2017039926 A | 2/2017 |
| JP | 6342502 | 6/2017 |
| JP | 2017125090 | 7/2017 |
| WO | 2000029495 A1 | 5/2000 |
| WO | 2015017068 A1 | 2/2015 |

OTHER PUBLICATIONS

Yuan, Cui Ming, et al., "Polymerization of methyl methacrylate in the presence of polyfunctional chain transfer agents," Macromol. Chem. Phys. 196, 2905-2913 (1995).

Extended European Search Report for corresponding EP Application No. 18171368.6 dated Sep. 11, 2018.

* cited by examiner

POLY (METH)ACRYLATE WITH IMPROVED VISCOSITY INDEX FOR LUBRICANT ADDITIVE APPLICATION

TECHNICAL FIELD

The present disclosure relates to polymers suitable for viscosity index improvers in lubricating oil compositions and further relates to oil compositions comprising such polymers. The disclosure also relates to polymer compositions derived from (meth)acrylate monomers, and various molar ratios of (meth)acrylate monomer units in the polymer suitable for use as viscosity modifiers.

BACKGROUND

Mineral or synthetic oil lubricants, such as driveline fluids, engine oils, or automatic transmission fluid (ATF), do not necessarily function the same over wide temperature variations. Such lubricants, for instance, may become less effective at high temperatures because heat reduces their viscosity and film-forming ability. Alternatively, lubricants can also become less effective at cold temperatures as the viscosity of the lubricant increases. This problem is common to many oil lubricants and can be characterized in terms of "viscosity index" (VI), which is an arbitrary measure for the change of viscosity of a lubricating oil with variations in temperature. The lower the VI, the greater the change in viscosity of the oil with temperature changes and vice versa. The viscosity of a lubricant is closely related to its ability to reduce friction. Generally, the least viscous lubricant which still forces two moving surfaces apart is desired. If the lubricant is too viscous, it will require a large amount of energy to move the surfaces; if it is too thin, the surfaces will come in contact and friction will increase. Many lubricant applications, such as lubrication for engine oils, driveline fluids, or automatic transmission fluids, require the lubricant to perform consistently across a wide range of temperatures. However, many lubricants do not inherently have a high enough VI to remain consistent across the wide range of temperatures required by an automobile.

In an attempt to address this shortcoming, a viscosity index improver ("VII") can be added to the lubricant. Viscosity index improvers are commonly polymers, and are added to reduce lubricant viscosity changes at high and low temperatures. When viscosity index improvers are added to low-viscosity oils, they effectively thicken the oil as temperature increases. This means the lubricating effect of mineral oils can be extended across a wider temperature range.

In some instances, automatic transmission fluids (ATF) help with the minimization of shudder (that is, anti-shudder properties), which is believed to be a function of the change of friction coefficient with time (dμ/dt<0) of the transmission. Furthermore, shift characteristics of automatic transmissions are primarily dependent on the frictional characteristics of the ATF. The ATF fluid typically needs to have a high and stable frictional performance over the life of the fluid, good anti-shudder performance, and anti-wear characteristics over a broad temperature range. These characteristics are often a challenge to balance with the requirement that today's ATF lubricant compositions also need to maximize service intervals, or even better, avoid oil service during the lifetime of the equipment. This is referred to in the industry as a lifetime fill or "fill-for-life" fluid. Therefore, maintenance of the friction properties of an ATF over time, i.e. friction durability, may also be a desired property of the fluid.

Several prior efforts at improving the friction properties of lubricating oils have been attempted, including the addition of, or increased levels of, lubricant components such as viscosity index improvers. As an example, one type of VII is poly (meth)acrylate (PMA) polymers. The addition of or increased levels of components can escalate manufacturing complexity and increase product costs. While PMA additives have been used as VIIs, known examples have advanced structures, rely on advanced technology that drives up the cost of manufacturing, and only have a moderate effect on viscosity index.

SUMMARY

This invention relates to a polymer having a high thickening power, higher viscosity index, and/or better (lower) Brookfield viscosity, which is suitable for a viscosity modifier in lubricating oil compositions. In one aspect, the polymer may include about 88 to about 96 mole percent of alkyl (meth)acrylate monomer units including at least short chain alkyl (meth)acrylate monomer units with an alkyl chain length of 1 to 4 carbons and long chain alkyl (meth)acrylate monomer units with an alkyl chain length of 12 to 20 carbons. The polymer may exhibit an alkyl molar ratio of the long chain alkyl (meth)acrylate monomer units to the short chain alkyl (meth)acrylate monomer units greater than 2.0 and less than 5.5 and further include about 0.1 to about 6 mole percent of 2-hydroxyethyl (meth)acrylate monomer units.

The polymer of the preceding paragraph may also be combined with one or more additional features individually or in combinations. These additional features include one or more of the following: wherein the polymer includes about 15 to about 30 mole percent of the short chain alkyl (meth)acrylate monomer units and about 58 to about 81 mole percent of the long chain alkyl (meth)acrylate monomer units; wherein the alkyl (meth)acrylate monomer units include both methyl (meth)acrylate and lauryl (meth)acrylate and wherein the polymer includes up to about 95 mole percent of the methyl (meth)acrylate and the lauryl (meth)acrylate combined; wherein a (meth)acrylate ratio of the sum of the mole percent of the methyl (meth)acrylate monomer units and the lauryl (meth)acrylate monomer units to the mole percent of the 2-hydroxyethyl (meth)acrylate monomer units is greater than about 14; wherein the (meth)acrylate ratio is about 16 to about 20 and the polymer has a viscosity index of about 280 or greater; wherein the polymer comprises about 5 to about 6 mole percent of the 2-hydroxyethyl (meth)acrylate monomer units; wherein the alkyl (meth)acrylate monomer units further include one or more of butyl (meth)acrylate monomer units or longer chain alkyl (meth)acrylate monomer units having an alkyl chain length of 16 to 20 carbons and wherein the polymer includes no more than 15 mole percent of the butyl (meth)acrylate and no more than about 7.5 mole percent of the alkyl (meth) acrylate having an alkyl chain length of 16 to 20 carbons; wherein the polymer is free of alkyl (meth)acrylate monomer units with an alkyl chain length from 5 to 9 carbons; wherein the polymer has a weight average molecular weight of at least about 100 kg/mole; wherein the polymer has a weight average molecular weight of at least about 150 kg/mole; wherein the polymer has a weight average molecular weight of at least about 200 kg/mole; wherein the polymer has a weight average molecular weight of about 150 to about 500 kg/mole; wherein the alkyl (meth)acrylate monomer units includes methyl (meth)acrylate monomer units, lauryl (meth)acrylate monomer units, optional butyl (meth)acrylate monomer units, and optional longer chain alkyl (meth)acrylate monomer units having an average alkyl chain length of 16 to 20 carbons; wherein the polymer includes about 15 to about 30 mole percent of methyl (meth)acrylate, about 60 to about 75 mole percent of lauryl (meth)acrylate, about 0 to about 15 mole percent of butyl (meth)acrylate, and about 0 to about 7.5 mole percent of longer chain alkyl (meth)acrylate having an alkyl chain length of 16 to 20 carbons; wherein the polymer includes about 0 to about 7.5 mole percent of dispersant monomer units; and/or, wherein the polymer exhibits a polydispersity index of about 1.5 to about 4.0.

In another aspect, the disclosure herein also provides for a lubricant oil composition includes a viscosity index improver. In one approach, the lubricant oil composition includes greater than 50% by weight of a base oil and a viscosity index improver including a (meth)acrylate polymer having as polymerized monomer units thereof about 88 to about 96 mole percent of alkyl (meth)acrylate monomer units including both short chain alkyl (meth)acrylate monomer units having an alkyl chain length of 1 to 4 carbons and long chain alkyl (meth)acrylate monomer units having an alkyl chain length of 12 to 20 carbons, and about 0.1 to about 6 mole percent of 2-hydroxyethyl (meth)acrylate monomer units. The polymer has an alkyl molar ratio of the long chain alkyl (meth)acrylate monomer units to the short chain alkyl (meth)acrylate monomer units is greater than 2.0 and less than 5.5.

The lubricant oil composition of the preceding paragraph may also be combined with one or more optional features either individually or in combination. These optional features include one or more of the following: wherein the (meth)acrylate polymer includes about 15 to about 30 mole percent of the short chain alkyl (meth)acrylate monomer units and about 58 to about 81 of the long chain alkyl (meth)acrylate monomer units; wherein the alkyl (meth) acrylate monomer units include both methyl (meth)acrylate monomer units and lauryl (meth)acrylate monomer units and wherein the (meth)acrylate polymer includes up to about 95 mole percent of the methyl (meth)acrylate and the lauryl (meth)acrylate monomer units combined; wherein the sum of the mole percent of the methyl (meth)acrylate monomer units and the lauryl (meth)acrylate monomer units divided by the mole percent of the 2-hydroxyethyl (meth)acrylate monomer units is a molar (meth)acrylate ratio of greater than about 14; wherein the molar (meth)acrylate ratio is greater than 14 to about 20 and the (meth)acrylate polymer has a viscosity index of about 280 or greater; wherein the (meth)acrylate polymer includes about 5 to about 6 mole percent of the 2-hydroxyethyl (meth)acrylate monomer units; wherein the alkyl (meth)acrylate monomer units further includes one or more of butyl (meth)acrylate monomer units and longer chain alkyl (meth)acrylate monomer units having an alkyl chain length of 16 to 20 carbons and wherein the (meth)acrylate polymer includes no more than 15 mole percent of the butyl (meth)acrylate monomer units and no more than about 7.5 mole percent of the longer chain alkyl (meth)acrylate monomer units having an alkyl chain length of 16 to 20 carbons; wherein the alkyl (meth)acrylate monomer units includes methyl (meth)acrylate monomer units, lauryl (meth)acrylate monomers units with an alkyl chain length of 12 to 15 carbons, optional butyl (meth) acrylate monomer units, and optional longer chain alkyl (meth)acrylate monomer units having an alkyl chain length of 16 to 20 carbons, wherein the (meth)acrylate polymer includes about 15 to about 30 mole percent of methyl (meth)acrylate, about 60 to about 75 mole percent of lauryl (meth)acrylate, about 0 to about 15 mole percent of butyl (meth)acrylate, and about 0 to about 7.5 mole percent of longer chain alkyl (meth)acrylate having an alkyl chain length of 16 to 20 carbons; wherein the polymer includes about 0 to about 7.5 mole percent of dispersant monomer units; wherein the polymer is free of alkyl (meth)acrylate monomer units with an alkyl chain length from 5 to 9 carbons; wherein the polymer has a weight average molecular weight of at least about 100 kg/mole; wherein the polymer has a weight average molecular weight of at least about 150 kg/mole; wherein the polymer has a weight average molecular weight of at least about 200 kg/mole; wherein the polymer has a weight average molecular weight of about 150 to about 500 kg/mole; wherein a treat rate of the (meth)acrylate polymer in the lubricant oil composition is about 1 to about 10 weight percent; and/or wherein the (meth)acrylate polymer has a polydispersity index of about 1.5 to about 4.

DETAILED DESCRIPTION

This present disclosure describes a new class of poly (meth)acrylate ("PMA") polymers synthesized from a unique combination of monomers that provides improved and high viscosity index (VI). These polymers are particularly suited for use in lubricant oil compositions including, but not limited to, driveline fluids, engine oils, and/or automatic transmission fluids. The selected monomers for the polymers herein include alkyl esters of (meth)acrylic acid, and include select amounts of long chain alkyl esters and short chain alkyl esters in combination with 2-hydroxyethyl (meth)acrylate ("HEMA"). In particular, the polymers herein provide PMAs with a high viscosity index based on simpler and less costly linear random copolymer technology. It was unexpectedly determined that HEMA containing PMA viscosity index improvers ("VII") with the select levels of long and short chain alkyl (meth)acrylate monomer units described herein provided higher VI compared to analogous PMA containing only alkyl functionality in the polymer backbone or alkyl functionality not within the selected relationships discovered herein.

The long chain alkyl ester monomers (or monomer units in the polymer) include esters such as lauryl (meth)acrylate ("LMA") and cetyl-eicosyl (meth)acrylate ("CEMA") as those monomers and monomer units are set forth below. The short chain alkyl ester monomers (or monomer units in the polymer) include esters such as methyl (meth)acrylate ("MMA"), ethyl (meth)acrylate, propyl (meth)acrylate, t-butyl (meth)acrylate, and n-butyl (meth)acrylate ("n-BMA"). In one approach, the combination of monomers or monomer units includes from about 88 mole percent to about 96 mole percent alkyl ester monomers or monomer units and up to about 10 mole percent of HEMA monomer or monomer units and, preferably, about 0.1 to about 6 mole percent of HEMA monomer or monomer units and other ranges as set forth below. The 2-hydroxyethyl functionality in the PMA backbone from the presence of HEMA combined with the selected ratios of long and short chain alkyl esters gives the resulting polymer a higher VI and can enhance shrinkage of PMA at a low temperature and expansion of PMA at a high temperature to enable the polymers to achieve the high viscosity index values. As used herein, "(meth)acrylate" refers to both methacrylate and/or acrylate monomers or monomer units (or mixtures) as needed for an application.

High VI PMA polymers and lubricants including such polymers have improved and consistent performance over a wider temperature range, and therefore can provide benefits to automobiles, such as increasing fuel economy. As stated above, the addition of or increased levels of components can escalate manufacturing complexity and increase product costs; however, the high VI PMA additives herein provide benefits over a wider temperature range (due to the high VI of the polymers) such as but not limited to vehicle fuel economy, particularly in an automatic transmission. These benefits can be achieved with lower treat rates of the VII in the lubricating oil. While PMA additives are known in the art, known examples have advanced structures and rely on advanced technology, which drives up the cost of manufacturing, and prior PMA additives also have limited ability to achieve high VI improvement or may require higher treat rates to achieve similar results. The PMA VIIs of the present disclosure, on the other hand, provide a simpler and less costly linear random copolymer technology and achieve even higher VI than prior polymers through a unique selection of monomer relationships. That is, the PMA viscosity index improvers disclosed herein are preferably linear polymers and comprise mixtures of long chain alkyl (meth)acrylate monomer units, short chain alkyl (meth)acrylate monomer units, and 2-hydroxyethyl (meth)acrylate (HEMA) monomer units in select amounts and ratios. The present disclosure further includes PMA polymers (and lubricant oils containing such polymers) comprising novel combinations of the monomers or monomer units described herein, which provide a surprisingly and unexpectedly high viscosity index relative to other PMA VII's known in the art.

While the primary long chain functionality of the PMA VIIs of the present disclosure is lauryl (meth)acrylate or LMA monomer units, these long chain functionalities can also include longer chains, such as cetyl-eicosyl (meth)acrylate or CEMA monomer units. Similarly, while the primary short chain functionality of the PMA VIPs of the present disclosure is methyl (meth)acrylate or MMA monomer units, these short chain functionalities can also include other short chains, such as ethyl (meth)acrylate, propyl (meth)acrylate, t-butyl (meth)acrylate, and n-butyl (meth)acrylate or n-BMA monomer units. When present in the PMA VIIs of the present disclosure, the abundance of CEMA is typically no more than 10 mole percent (preferably less than 7.5 mole percent). Similarly, when present in the PMA VIIs of the present disclosure, the abundance of n-BMA is typically no more than 15 mole percent (preferably no more than 10 mole percent).

Additionally, the PMA VIIs of the present disclosure are typically free of monomers and monomer units with intermediate alkyl chain length functionalities having carbon chain lengths of 5 to 9 carbons. As used herein, free of generally means less than about 0.5 mole percent, in other approaches, less than about 0.25 mole percent, in other approaches, less than about 0.1 mole percent, and, in other approaches none.

The PMA VIIs of the present disclosure are typically synthesized to have a weight average molecular weight of at least 10 kg/mole, in other approaches, at least about 100 kg/mole, in other approaches, at least about 150 kg/mole, and in yet another approaches, at least about 200 kg/mole. In other embodiments, the PMA VIIs of the present disclosure are synthesized to have a weight average molecular weight of up to about 500 kg/mole, in other approaches, about 10 to about 500 kg/mole, in other approaches, about 150 to about 500 kg/mole, and in yet other approaches, about 200 to about 500 kg/mole. In yet other embodiments, the PMA VIIs of present disclosure may also have weight average molecular weights of about 10 to about 50 kg/mole, in other approaches, about 50 to about 100 kg/mole, in other approaches, about 100 to about 400 kg/mole, in other approaches, about 150 to about 400 kg/mole, and in yet further approaches, about 200 to about 400 kg/mole.

The present disclosure also includes a lubricant oil composition comprising a base oil and a PMA VII as described herein. The PMA VIIs are typically present in the lubricant oil compositions in about 1 to about 10 weight percent (in other approaches, about 3 to about 6 weight percent, and in yet further approaches, about 3.5 to about 5.5 weight percent). As used herein, the weight percent of the PMA VIIs refers to the weight percent of the polymer solids in the lubricating oil and not any carrier oil or other diluent commonly associated with such polymers when added to the lubricating oil compositions (that is, in an oil free basis).

Viscosity Index Improver Polymer

Turning to more of the specifics and in one aspect, the present disclosure includes a polymer suitable for a viscosity index improver (VII) in lubricating oil compositions. The polymer includes the reaction product in the form of a linear, random polymer of select amounts of both long and short chain alkyl (meth)acrylate monomers combined with 2-hydroxyethyl (meth)acrylate monomers. In some approaches, the reaction product (and resulting polymer) includes about 88 to about 96 mole percent of the alkyl (meth)acrylate monomers (or monomer units in the resulting polymer) including at least both short chain alkyl (meth)acrylate monomers (or monomer units) with an alkyl chain length of 1 to 4 carbons and long chain alkyl (meth)acrylate monomers (or monomer units) with an alkyl chain length of 12 to 20 carbons in combination with up to about 10 mole percent 2-hydroxyethyl ethyl (meth)acrylate or HEMA monomer (or monomer units), in other approaches, about 0.1 to about 10 mole percent of the HEMA, in yet other approaches, about 0.1 to about 6 mole percent of the HEMA, and in yet further approaches, about 1 to about 6 mole percent of the HEMA. Further ranges of the HEMA monomer or monomer unit are discussed below. In one approach, the polymer is also free of alkyl (meth)acrylate monomers (or monomer units) with an intermediate alkyl chain length from 5 to 9 carbons.

As mentioned above, the polymer includes select relationships between the various monomers or monomer units in order to achieve the unexpectedly high viscosity index and thickening power with relatively low levels of the VII in lubricating oil.

Alkyl Ratio:

Typically, the PMA VIIs of the present disclosure have a higher abundance of long chain alkyl functionalities compared to the short chain alkyl functionalities in combination with HEMA monomer units. For instance and in some approaches, the polymer has an alkyl molar ratio of the long chain alkyl (meth)acrylate monomers or monomer units (i.e., LMA and/or CEMA) to the short chain alkyl (meth) acrylate monomers or monomer units (i.e., MMA and/or n-BMA) as an alkyl ratio of long chain alkyl/short chain alkyl monomer units of less than about 5.5, in other approaches, about 2 to about 5.5, and in yet other approaches, about 2.5 to less than about 4 or less than 4. This relationship, when combined in a polymer with the HEMA levels herein (and preferably less than about 6 mole percent HEMA), resulted in a polymer with a viscosity index greater than about 280, and in other approaches about 280 to about 330 and in yet further approaches, about 290 to about 330.

Figure 1:
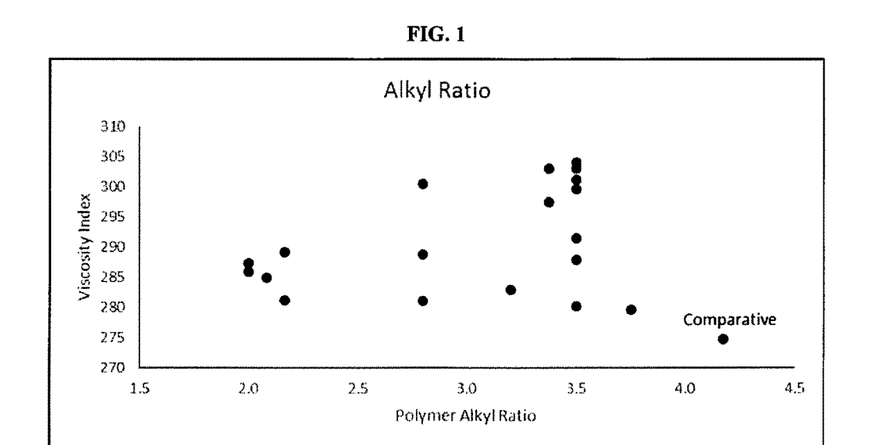
FIG. 1 is a graph of the improved Viscosity Index (VI) of representative PMA polymers as a function of an alkyl ratio of long chain alkyl (meth)acrylate to short chain alkyl (meth)acrylate in the PMA polymer.

FIG. 1 provides a graphical representation of this alkyl molar ratio of polymers of the present disclosure compared to prior art polymers. FIG. 1 shows that the alkyl molar ratio (in terms of the mole percent of long chain/short chain monomer units) from polymers of the present disclosure can lead to dramatic improvements in VI of about 5 to 30 points as compared to prior art VII additives with an alkyl ratio of 4 or greater. The prior art polymer included higher levels of HEMA.

In other embodiments, the molar ratio of the long chain alkyl (meth)acrylate monomers to the short chain alkyl (meth)acrylate monomers in the PMA VII's of the present disclosure is greater than about 2 and less than about 5.5 (e.g. greater than about 2.5 and less than about 4, about 2.0, about 2.1, about 2.2, about 2.8, about 3.2, about 3.4, about 3.5, or about 3.8).

(Meth)Acrylate Ratio:

In other approaches, the polymers herein also achieve a high VI in part due to a select (meth)acrylate ratio, which is a ratio of the sum of the mole percent of the methyl (meth)acrylate monomer or monomer units and the lauryl (meth)acrylate monomer or monomer units to the mole percent of the 2-hydroxyethyl (meth)acrylate monomer or monomer units (e.g., (MMA+LMA)/HEMA). For instance, this (meth)acrylate ratio may be preferably greater than about 14, in other approaches, greater than about 14 to about 20, in yet other approaches, about 16 to about 20, and in yet other approaches, about 16 to about 19. In alternative approaches, the (meth)acrylate ratio may be less than about 12, in other approaches, less than about 11, and in yet other approaches, about 7 to about 11. This (meth)acrylate relationship, when combined in a polymer with the selected HEMA amounts resulted in a polymer with a viscosity index greater than about 280, and in other approaches about 280 to about 330 and in yet further approaches, about 290 to about 330.

Figure 2:
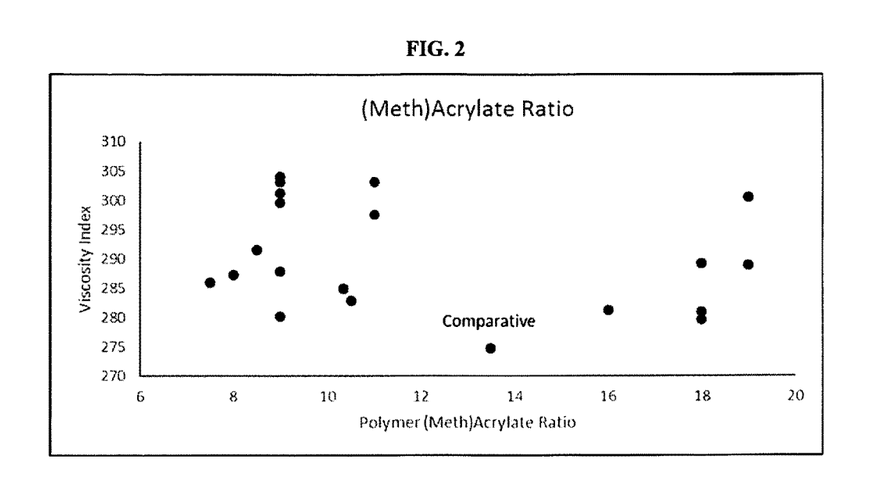
FIG. 2 is a graph of the improved Viscosity Index (VI) of representative PMA polymers as a function of a (meth)acrylate ratio of the sum of lauryl (meth)acrylate and methyl (meth)acrylate to hydroxyethyl (meth)acrylate (HEMA) in the PMA polymer.

FIG. 2 provides a graphical representation of this (meth)acrylate ratio (that is, (LMA+MMA)/HEMA) of the polymers of the present disclosure compared to prior art polymers. FIG. 2 shows that a (meth)acrylate ratio of polymers from the present disclosure greater than about 14 can lead to improvements in VI of about 5 to about 30 points as compared to a prior art VII additive with a (meth)acrylate ratio (that is, (LMA+MMA)/HEMA) ratio of between 13 and 14. It was unexpected that such select relationships of monomers compared to HEMA amounts in the polymer would lead to such dramatic increases in viscosity index for the polymer.

More specifically, FIG. 1 and/or FIG. 2 show that the VI of the PMA polymers known in the art are generally about 275 or below, while the VI of the PMA's of the present disclosure range from about 280 or above and, in some cases, about 280 to about 330. Accordingly, this data shows strong evidence of unexpectedly improved VI of the PMA's of the present disclosure in comparison with the expected VI of PMA's known in the art.

Short Chain Alkyl (Meth)Acrylate Monomers or Monomer Units:

In one embodiment, the polymer may include about 10 to about 40 mole percent of the short chain alkyl (meth) acrylate monomers or monomer units, in other approaches, about 15 to about 30 mole percent, and in yet other approaches, about 15 to about 25 mole percent of the short chain alkyl (meth)acrylate. The short chain alkyl (meth) acrylate monomers or monomer units include those with an alkyl chain length of 1-4 carbon atoms and include, for example, methyl(meth)acrylate and n-butyl (meth)acrylate as shown in the structures below:

General Short Chain (Meth)acrylate    n-BMA    MMA where R is a hydrogen atom if the monomer or repeating unit thereof is an acrylate or $CH_3$ if the monomer or repeating unit thereof is a methacrylate and R1 is a C1 to C4 carbon chain. In other approaches, the polymer may include at least about 20 mole percent of the short chain alkyl (meth) acrylate combined with the other monomers or units discussed herein (in yet other approaches, about 20 mole percent, about 21.8 mole percent, about 25 mole percent, or about 30 mole percent).

Long Chain Alkyl (Meth)Acrylate Monomers:

The polymer may also include about 50 to about 85 mole percent of the long chain alkyl (meth)acrylate monomers or monomer units and, in other approaches, about 58 to about 81 mole percent. Long chain alkyl (meth)acrylate monomers include those with an alkyl chain length from 12 to 20 carbons as shown in the structures below and may include lauryl (meth)acrylate or LMA (as defined below) and cetyleiosyl (meth)acrylate or CEMA (as defined below):

General Long Chain (Meth)acrylate    CEMA    LMA

CEMA    LMA where R is a hydrogen atom if the monomer or repeating unit thereof is an acrylate or $CH_3$ if the monomer or repeating unit is a methacrylate, R2 is a C12 to C20 alkyl chain, R3 is a C16 to C20 alkyl chain or a blend of C16 to C20 with the majority of alkyl chains in the blend being C16 and/or C18, and R4 is a C12 to C15 alkyl chain or a blend of C12 to C15 with the majority in the blend being C12. In yet another approach, the polymer may include at least about 60 mole percent of the long chain alkyl (meth)acrylate monomer or repeating units thereof (e.g. about 60 mole percent, about 62.5 mole percent, about 65 mole percent, about 67.5 mole percent, about 69.8 mole percent, about 70 mole percent, or about 75 mole percent).

The long chain alkyl (meth)acrylate LMA or lauryl (meth) acrylate as used herein, in some approaches, includes a blend of (meth)acrylate monomers or monomer units having alkyl chain lengths ranging from C12 to C15 and, in particular, alkyl chains of 12, 14, and 15 carbons in the blend. For example, the LMA or LMA blend may include a majority of alkyl (meth)acrylate monomers or monomer units with C12 chains and further including minor amounts of monomers or monomer units with C14 and C15 chains mixed in a blend. In one approach, the LMA may include about 67 to about 75 mole percent alkyl (meth)acrylate with C12 alkyl chains (in other approaches, about 69 to about 75 mole percent C12 chains) and also include about 24 to about 30 mole percent alkyl (meth)acrylate with C14 alkyl chains (in other approaches, about 25 to about 29 C14 chains) and about 0 to about 3 mole percent alkyl (meth)acrylate with C15 alkyl chains (in other approaches, about 1 to about 2 mole percent C15 alkyl chains). Unless stated otherwise, when this disclosure refers to LMA or lauryl (meth)acrylate, the blend of the above monomers or monomer units is intended and all monomers in the blend will be randomly polymerized in their respective amounts as random monomer units or random repeating into the polymer backbone.

The long chain alkyl (meth)acrylate CEMA or cetyl-eiosyl (meth)acrylate as used herein, in some approaches, includes a blend of (meth)acrylate monomers or monomer units having alkyl chain lengths ranging from C16 to C20 and in particular 16, 18, and 20 carbons. For example, the CEMA monomer blend or monomer unit blend may include a majority of C16 and C18 chains with minor amounts of C20 chains. For simplicity herein, the CEMA monomer or monomer units may be referred to as an alkyl (meth) acrylate monomer or monomer unit with C18 alkyl chains even though it may contain a majority of C16 and/or C18 alkyl chains. In one approach, the CEMA monomer may include about 29 to about 36 mole percent alkyl (meth)acrylate with C18 alkyl chains (in other approaches, about 30 to about 35 mole percent C18 chains) and also include about 46 to about 54 mole percent alkyl (meth)acrylate with C16 alkyl chains (in other approaches, about 47 to about 53 mole percent C16 chains) and about 9 to about 17 mole percent alkyl (meth) acrylate with C20 alkyl chains (in other approaches, about 10 to about 16 mole percent C20 chains). In some approaches, the CEMA may also include up to about 4.5 mole percent of (meth)acrylate with alkyl chains shorter than C16 and up to 3 mole percent of alkyl chains greater than C20. Unless stated otherwise, when this disclosure refers to CEMA or cetyl-eiosyl (meth)acrylate, the blend of the above monomers or monomer units is intended and all monomers in the blend are randomly polymerized in their respective amounts as random monomer units or random repeating units into the polymer.

HEMA:

HEMA or 2-hydroxyethyl (meth)acrylate is a hydroxyester (meth)acrylate having the structure shown below:

where R is a hydrogen if the monomer or repeating unit thereof is an acrylate and $CH_3$ if the monomer or repeating unit thereof is a methacrylate. In one approach, the polymer includes about 0.1 to about 10 mole percent of HEMA, in other approaches, about 0.1 to about 7.5 mole percent, in yet other approaches, about 0.1 to about 6 mole percent, and in yet other approaches, about 1 to about 6 percent. In yet other embodiments, the polymer may contain about 2 to about 6 mole percent of HEMA, about 3 to about 6 mole percent of HEMA, about 4 to about 6 mole percent HEMA, or about 5 to about 6 mole percent HEMA. In other embodiments, the polymer may include about 7.5 to about 10 mole percent of HEMA, in other approaches, about 5 mole percent, about 7.5 mole percent, about 8.4 mole percent, or about 10 mole percent of the 2-hydroxyethyl (meth)acrylate. In yet further approaches, the polymer may include about 0.1 to 6 mole percent HEMA, and in yet further approaches, about 1 to 6 mole percent HEMA. In further embodiments, the polymer may contain about 2 to about 4 mole percent HEMA, about 2 to about 3 mole percent HEMA, or about 1 to about 4 mole percent HEMA. In some approaches, the HEMA is free of or not functionalized with amines or other nitrogen containing compounds.

During polymerization, the monomers in the reaction mixture randomly form carbon-carbon bonds at the monomer olefin functionality to form linear, random polymers with repeating units or monomer units of carbon chains (PMA) having functional moieties or side chains consistent with the concentrations of the monomers in the original reaction mixture. The various monomers are polymerized using either free radical polymerization or reversible addition-fragmentation chain transfer polymerization, discussed more below, to form a random polymer of the general structure below:

wherein R is a hydrogen or methyl group, a is an integer sufficient to provide about 15 to about 30 mole percent of the MMA monomer units, b is an integer sufficient to provide about 1 to about 6 mole percent of the HEMA monomer units, c is an integer sufficient to provide about 0 to about 15 mole percent of the n-BMA monomer units, d is an integer sufficient to provide about 50 to about 75 mole percent or about 60 to about 75 mole percent of the LMA monomer units, and e is an integer sufficient to provide about 0 to about 7.5 mole percent of the CEMA monomer units. R3 and R4 are as described previously. Optionally, the polymer may also include dispersant monomer units wherein R5 is a moiety to provide dispersant functionality, and, thus, f is an integer sufficient to provide about 0 to about 7.5 mole percent of dispersant monomer units to the polymer. The optional dispersant monomer units are discussed more below. The structure above may also include integers a, b, c, d, and e sufficient to provide the other ranges of those monomer units as described herein.

As used herein, monomers generally refers to the compound within the reaction mixture prior to polymerization and monomer units or (alternatively) repeating units refers to the monomer as polymerized within the polymeric backbone. The various monomers herein are randomly polymerized within the backbone as the monomer units or repeating units. If the discussion refers to a monomer, it also implies the resultant monomer unit thereof in the polymer. Likewise, if the discussion refers to a monomer unit or repeating unit, it also implies the monomer mixture used to form the polymer with the associated monomer or repeating units therein.

In one embodiment, the polymer has a weight average molecular weight of at least about 10 kg/mole, in other approaches, at least about 100 kg/mole, in other approaches, at least about 150 kg/mole, and in yet other approaches at least about 200 kg/mole. The polymer may also have a weight average molecular weight ranging from about 10 kg/mole to about 500 kg/mole, in other approaches, about 10 kg/mole to about 50 kg/mole, in yet further approaches, about 50 to about 100 kg/mole, in further approaches, about 100 kg/mole to about 500 kg/mole; in other approaches, about 150 kg/mole to about 500 kg/mole, and in yet other approaches, about 200 to about 500 kg/mole.

The polymer may also have a polydispersity index (PDI) of about 1.5 to about 4.0, in other approaches, about 1.5 to about 3.5, in yet other approaches, about 2 to about 4, and in yet other approaches, about 2 to about 3.5.

In one embodiment, the alkyl (meth)acrylate monomers or monomer units include both methyl (meth)acrylate and lauryl (meth)acrylate and wherein the polymer includes up to about 95 mole percent (in other approaches, up to 90 mole percent) of the methyl (meth)acrylate monomer units and the lauryl (meth)acrylate monomer units combined. In other approaches, the polymer includes from about 75 mole percent to about 95 mole percent (e.g. 75 mole percent, 77.5 mole percent, 80 mole percent, 82.5 mole percent, 85 mole percent, 88.3 mole percent, and 90 mole percent) of the methyl (meth)acrylate and the lauryl (meth)acrylate combined.

In another embodiment, the alkyl (meth)acrylate monomers further include one or both of butyl (meth)acrylate monomer units and also longer chain alkyl (meth)acrylates monomer units having an average alkyl chain length of 16 to 20 carbons and wherein the polymer includes no more than 15 mole percent of the butyl (meth)acrylate (in other approaches, about 0 to about 15 mole percent, about 5 to about 15 mole percent, about 7.5 to about 12.5 mole percent, or about 10 mole percent) and no more than about 7.5 mole percent (in other approaches, about 0 to about 7.5 mole percent, about 2 to about 7.5 mole percent, about 2 to about 5 mole percent, about 3.3 mole percent, or about 5 mole percent) of the alkyl (meth)acrylate with an average alkyl chain length of 16 to 20 carbons (predominately 16 and/or 18 carbons).

Dispersant Monomer and Other Monomer Units:

The poly(meth)acrylate polymers herein may optionally be functionalized with other monomers and monomer units including (meth)acrylic and one or more dispersant monomer or monomer units. For example, the polymer may include about 0 to about 7.5 mole percent other monomer units (in other approaches, about 1 to about 7.5 mole percent) of one or more dispersant monomers or monomer or other (meth)acrylic monomers or monomer units polymerized within the polymer backbone to provide dispersant functionality or other functionalities to the polymer. In other approaches, the polymer may include about 2 to about 6, about 3 to about 4, or about 3 to about 5 mole percent of the dispersant or other monomer units. In one approach, a dispersant monomer or monomer unit may be nitrogen-containing monomers or units thereof. Such monomers, if used, may impart dispersant functionality to the polymer.

In some approaches, the nitrogen-containing monomers may be (meth)acrylic monomers such as methacrylates, methacrylamides, and the like. In some approaches, the linkage of the nitrogen-containing moiety to the acrylic moiety may be through a nitrogen atom or alternatively an oxygen atom, in which case the nitrogen of the monomer will be located elsewhere in the monomer. The nitrogen-containing monomer may also be other than a (meth)acrylic monomer, such as vinyl-substituted nitrogen heterocyclic monomers and vinyl substituted amines. Nitrogen-containing monomers are well known, examples being disclosed, for instance, in U.S. Pat. No. 6,331,603. Other suitable dispersant monomers include, but are not limited to, dialkylaminoalkyl acrylates, dialkylaminoalkyl methacrylates, dialkylaminoalkyl acrylamides, dialkylaminoalkyl methacrylamides, N-tertiary alkyl acrylamides, and N-tertiary alkyl methacrylamides, where the alkyl group or aminoalkyl groups may contain, independently, 1 to 8 carbon atoms. For instance, the dispersant monomer may be dimethylaminoethyl(meth)acrylate. The nitrogen-containing monomer may be, for instance, t-butyl acrylamide, dimethylaminopropyl methacrylamide, dimethylaminoethyl methacrylamide, N-vinyl pyrrolidone, N-vinylimidazole, or N-vinyl caprolactam. It may also be a (meth)acrylamide based on any of the aromatic amines disclosed in WO2005/087821 including 4-phenylazoaniline, 4-aminodiphenylamine, 2-aminobenzimidazole, 3-nitroaniline, 4-(4-nitrophenylazo)aniline, N-(4-amino-5-methoxy-2-methyl-phenyl)-benzamide, N-(4-amino-2,5-dimethoxy-phenyl)-benzamide, N-(4-amino-2,5-diethoxy-phenyl)-benzamide, N-(4-amino-phenyl)-benzamide, 4-amino-2-hydroxy-benzoic acid phenyl ester, and N,N-dimethyl-phenylenediamine.

Thickening Power:

The unique PMA VIIs of the present disclosure unexpectedly have higher thickening power, that is, provide a higher viscosity at a low treat rate of the VII polymer in the lubricating oil. The polymers herein with HEMA polymerized in the polymer chain (and when using the other particular monomer and monomer unit relationships described herein) thickens lubricating oils to a target KV100 viscosity with lower treat rates of the VII polymer.

As used herein, thickening power refers to the ability of the viscosity index improver polymer to achieve a target KV100 viscosity of the lubricating oil composition, such as about 5.9 to about 6.1 cSt, with a relatively lower treat rate of the PMA VIIs polymers within the lubricating oil composition. For example, typical base oils may have a viscosity of around 2.2 to about 2.4 cSt. The base oil treated with a common DI additive package (that is dispersants, detergents, other additives, etc.) may have a KV100 viscosity of about 2.6 to about 2.8 cSt. Thus, the thickening power of the viscosity index improver, as used herein, is the ability of the VII polymer to further increase the lubricant oil KV100 viscosity to a targeted KV100, such as about 5.9 to 6.1 cSt of the oils herein, with the least amount of added VII. For instance, the thickening power of the PMA VIIs of the present disclosure (with the select monomer units and ratios or relationships of those monomer units as described herein) is greater than about 0.59 cSt/weight percent and, in other approaches, about 0.59 to about 0.96 cSt/weight percent. Thickening power refers to the viscosity increase of the lubricating oil at the specific temperature per the same weight percent of the VII polymer solids in the base oil composition. Thickening power is calculated by the delta KV100 (target KV100-KV100 of base oil and DI package) divided by the treat rate of VII. Exemplary thickening power of the polymers herein can be found in Table 5 below.

Lubricating Oil Composition

In another aspect, the present disclosure includes a lubricant oil composition including the unique PMA VII described above. The lubricating oil composition may be a driveline oil, an automobile transmission fluid, an engine oil, and the like. In one approach, the lubricant oil composition includes greater than 50% by weight of a base oil and at least the viscosity index improver including the poly (meth) acrylate polymer described herein. The lubricating oil composition may also include other additives or components as discussed further below.

In one embodiment of this aspect, a treat rate (on an oil free basis) of the (meth)acrylate polymer in the lubricant oil composition is about 1 to about 10 weight percent, in other approaches, about 1 to about 5 weight percent, and in yet other approaches, about 2.5 to about 7.5 weight percent. In some other approaches, the lubricating oil composition may include about 3.4%, about 3.5%, about 3.7%, about 4.0%, about 4.2%, about 4.3%, about 4.6%, about 4.8%, about 4.9%, about 5.2%, about 5.3%, about 5.4%, or about 5.6% of the (meth)acrylate polymer as a viscosity index improver.

As used herein, the terms "oil composition," "lubrication composition," "lubricating oil composition," "lubricating oil," "lubricant composition," "fully formulated lubricant composition," and "lubricant" are considered synonymous, fully interchangeable terminology referring to the finished lubrication product comprising a major amount of a base oil plus minor amounts of the viscosity index improver and the other optional components. In some approaches, the lubricant oil composition may be an automatic transmission fluid and, in such use, may have a Brookfield viscosity at −40° C. not more than about 30,000 cP (centipoise, units of dynamic viscosity) and, in some approaches, between about 5,000 and about 20,000 cP using ASTM-2983. In other approaches, a kinematic viscosity at 100° C. for these lubricants oil compositions ranges from about 3.5 to about 7.0 cSt.

Base Oil:

As used herein, the term "base oil" generally refers to oils categorized by the American Petroleum Institute (API) category groups Group I-V oils as well as animal oils, vegetable oils (e.g. castor oil and lard oil), petroleum oils, mineral oils, synthetic oils, and oils derived from coal or shale. The American Petroleum Institute has categorized these different basestock types as follows: Group I, greater than 0.03 wt percent sulfur, and/or less than 90 vol percent saturates, viscosity index between 80 and 120; Group II, less than or equal to 0.03 wt percent sulfur, and greater than or equal to 90 vol percent saturates, viscosity index between 80 and 120; Group III, less than or equal to 0.03 wt percent sulfur, and greater than or equal to 90 vol percent saturates, viscosity index greater than 120; Group IV, all polyalphaolefins. Hydrotreated basestocks and catalytically dewaxed basestocks, because of their low sulfur and aromatics content, generally fall into the Group II and Group III categories. Polyalphaolefins (Group IV basestocks) are synthetic base oils prepared from various alpha olefins and are substantially free of sulfur and aromatics.

Groups I, II, and III are mineral oil process stocks. Group IV base oils contain true synthetic molecular species, which are produced by polymerization of olefinically unsaturated hydrocarbons. Many Group V base oils are also true synthetic products and may include diesters, polyol esters, polyalkylene glycols, alkylated aromatics, polyphosphate esters, polyvinyl ethers, and/or polyphenyl ethers, and the like, but may also be naturally occurring oils, such as vegetable oils. It should be noted that although Group III base oils are derived from mineral oil, the rigorous processing that these fluids undergo causes their physical properties to be very similar to some true synthetics, such as PAOs. Therefore, oils derived from Group III base oils may sometimes be referred to as synthetic fluids in the industry.

The base oil used in the disclosed lubricating oil composition may be a mineral oil, animal oil, vegetable oil, synthetic oil, or mixtures thereof. Suitable oils may be derived from hydrocracking, hydrogenation, hydrofinishing, unrefined, refined, and re-refined oils, or mixtures thereof.

Unrefined oils are those derived from a natural, mineral, or synthetic source with or without little further purification treatment. Refined oils are similar to unrefined oils except that they have been treated by one or more purification steps, which may result in the improvement of one or more properties. Examples of suitable purification techniques are solvent extraction, secondary distillation, acid or base extraction, filtration, percolation, and the like. Oils refined to the quality of an edible oil may or may not be useful. Edible oils may also be called white oils. In some embodiments, lubricant compositions are free of edible or white oils.

Re-refined oils are also known as reclaimed or reprocessed oils. These oils are obtained in a manner similar to that used to obtain refined oils using the same or similar processes. Often these oils are additionally processed by techniques directed to removal of spent additives and oil breakdown products.

Mineral oils may include oils obtained by drilling, or from plants and animals and mixtures thereof. For example such oils may include, but are not limited to, castor oil, lard oil, olive oil, peanut oil, corn oil, soybean oil, and linseed oil, as well as mineral lubricating oils, such as liquid petroleum oils and solvent-treated or acid-treated mineral lubricating oils of the paraffinic, naphthenic or mixed paraffinic-naphthenic types. Such oils may be partially or fully-hydrogenated, if desired. Oils derived from coal or shale may also be useful.

Useful synthetic lubricating oils may include hydrocarbon oils such as polymerized, oligomerized, or interpolymerized olefins (e.g., polybutylenes, polypropylenes, propyleneisobutylene copolymers); poly(1-hexenes), poly(1-octenes), trimers or oligomers of 1-decene, e.g., poly(1-decenes), such materials being often referred to as α-olefins, and mixtures thereof; alkyl-benzenes (e.g. dodecylbenzenes, tetradecylbenzenes, dinonylbenzenes, di-(2-ethylhexyl)-benzenes); polyphenyls (e.g., biphenyls, terphenyls, alkylated polyphenyls); diphenyl alkanes, alkylated diphenyl alkanes, alkylated diphenyl ethers and alkylated diphenyl sulfides and the derivatives, analogs and homologs thereof or mixtures thereof.

Other synthetic lubricating oils include polyol esters, diesters, liquid esters of phosphorus-containing acids (e.g., tricresyl phosphate, trioctyl phosphate, and the diethyl ester of decane phosphonic acid), or polymeric tetrahydrofurans. Synthetic oils may be produced by Fischer-Tropsch reactions and typically may be hydroisomerized Fischer-Tropsch hydrocarbons or waxes. In an embodiment, oils may be prepared by a Fischer-Tropsch gas-to-liquid synthetic procedure as well as from other gas-to-liquid oils.

The amount of the base or lubricating oil present may be the balance remaining after subtracting from 100 wt % the sum of the amounts of the viscosity index improver noted herein as well as any further optional performance additives also noted herein. For example, the base or lubricating oil that may be present in a finished fluid may be a major amount, such as greater than about 50 wt. %, greater than about 60 wt. %, greater than about 70 wt. %, greater than about 80 wt. %, greater than about 85 wt. %, or greater than about 90 wt. %.

The lubricants may also include other optional additives as needed for particular applications. Several common optional additives are noted herein.

Optional Additive Components

In addition to the base oils and viscosity index improvers set forth above, lubricant compositions such as on the automatic transmission lubricating compositions, may also include other additives to perform one or more functions required of a lubricating fluid. Further, one or more of the mentioned additives may be multi-functional and provide other functions in addition to or other than the function prescribed herein.

For example, the compositions herein may include one or more of at least one component selected from the group consisting of an additional viscosity index improver, a dispersant, a detergent, a friction modifier, an antioxidant, a corrosion inhibitor, a foam inhibitor, a seal-swell agent, anti-rust agent, extreme pressure additives, anti-wear agents, and combinations thereof. Other performance additives may also include, in addition to those specified above, one or more of metal deactivators, ashless TBN boosters, demulsifiers, emulsifiers, pour point depressants, and mixtures thereof. Typically, fully-formulated lubricating oils will contain one or more of these performance additives. Examples of some common optional additive components are set forth below.

Additional Viscosity Modifiers:

The lubricating oil compositions herein also may optionally contain one or more additional or supplemental viscosity index improvers. Suitable supplemental viscosity index improvers may include polyolefins, olefin copolymers, ethylene/propylene copolymers, polyisobutenes, hydrogenated styrene-isoprene polymers, styrene/maleic ester copolymers, hydrogenated styrene/butadiene copolymers, hydrogenated isoprene polymers, alpha-olefin maleic anhydride copolymers, poly(meth)acrylates, polyacrylates, polyalkyl styrenes, hydrogenated alkenyl aryl conjugated diene copolymers, or mixtures thereof. Viscosity index improvers may include star polymers, comb polymers, and suitable examples may be described in US Publication No. 2012/0101017 A1.

The lubricating oil compositions herein also may optionally contain one or more dispersant viscosity index improvers in addition to the PMA viscosity index improver discussed above. Suitable dispersant viscosity index improvers may include functionalized polyolefins, for example, ethylene-propylene copolymers that have been functionalized with the reaction product of an acylating agent (such as maleic anhydride) and an amine; poly(meth)acrylates functionalized with an amine, or esterified maleic anhydride-styrene copolymers reacted with an amine.

If used, any additional viscosity modifier may be provided in about 0.01 to about 10 weight percent in the lubricant.

Dispersants:

The lubricant composition includes one or more select dispersants or mixtures thereof. Dispersants are often known as ashless-type dispersants because, prior to mixing in a lubricating oil composition, they do not contain ash-forming metals and they do not normally contribute any ash when added to a lubricant. Ashless-type dispersants are characterized by a polar group attached to a relatively high molecular weight hydrocarbon chain. Specific ashless dispersants discovered for the present disclosure include boronated and phosphorylated N-substituted long chain alkenyl succinimides.

The N-substituted long chain alkenyl succinimides may include polyisobutylene (PIB) substituents with a number average molecular weight of the polyisobutylene substituent in a range of about 1300 to about 2300 as determined by gel permeation chromatography (GPC) using polystyrene (with a number average molecular weight of 180 to about 18,000) as the calibration reference. The PIB substituent used in the dispersant also has a viscosity at 100° C. of about 2100 to about 2700 cSt as determined using ASTM 0445. Succinimide dispersants and their preparation are disclosed, for instance in U.S. Pat. Nos. 7,897,696 and 4,234,435, which are incorporated herein by reference. Succinimide dispersants are typically an imide formed from a polyamine, typically a poly(ethyleneamine). The dispersants typically include two succinimide moieties joined by a polyamine. The polyamine may be tetraethylenepentaamine (TEPA), triethylenetetraamine (TETA), pentaethylenhexaamine (PEHA), other higher nitrogen ethylene diamine species and/or mixtures thereof. The polyamines may be mixtures of linear, branched and cyclic amines. The PIB substituents may be joined to each succinimide moiety.

The N-substituted polyisobutylene succinimides dispersants herein may also boronated and phosphorylated in order to achieve the desired friction properties. These dispersants are generally the reaction products of i) at least one phosphorus compound and/or a boron compound and ii) at least one ashless dispersant.

Suitable boron compounds useful in forming the dispersants herein include any boron compound or mixtures of boron compounds capable of introducing boron-containing species into the ashless dispersant. Any boron compound, organic or inorganic, capable of undergoing such reaction can be used. Accordingly, use can be made of boron oxide, boron oxide hydrate, boron trifluoride, boron tribromide, boron trichloride, $HBF_4$ boron acids such as boronic acid (e.g. alkyl-$B(OH)_2$, or aryl-$B(OH)_2$), boric acid, (i.e., $H_3BO_3$), tetraboric acid (i.e., $H_2B_5O_7$), metaboric acid (i.e., $HBO_2$), ammonium salts of such boron acids, and esters of such boron acids. The use of complexes of a boron trihalide with ethers, organic acids, inorganic acids, or hydrocarbons is a convenient means of introducing the boron reactant into the reaction mixture. Such complexes are known and are exemplified by boron trifluoride-diethyl ether, boron trifluoride-phenol, boron trifluoride-phosphoric acid, boron trichloride-chloroacetic acid, boron tribromide-dioxane, and boron trifluoride-methyl ethyl ether.

Suitable phosphorus compounds for forming the dispersants herein include phosphorus compounds or mixtures of phosphorus compounds capable of introducing a phosphorus-containing species into the ashless dispersant. Any phosphorus compound, organic or inorganic, capable of undergoing such reaction can thus be used. Accordingly, use can be made of such inorganic phosphorus compounds as the inorganic phosphorus acids, and the inorganic phosphorus oxides, including their hydrates. Typical organic phosphorus compounds include full and partial esters of phosphorus acids, such as the mono-, di-, and tri esters of phosphoric acid, thiophosphoric acid, dithiophosphoric acid, thiophosphoric acid and tetrathiophosphoric acid; the mono-, di-, and tri esters of phosphorous acid, thiophosphorous acid, dithiophosphorous acid and trithiophosphorous acid; the trihydrocarbyl phosphine oxides: the trihydrocarbyl phosphine sulfides; the mono- and dihydrocarbyl phosphonates, (RPO(OR')(OR") where R and R' are hydrocarbyl and R" is a hydrogen atom or a hydrocarbyl group), and their mono-, di- and trithio analogs; the mono- and dihydrocarbyl phosphonites, (RP(OR')(OR") where R and R' are hydrocarbyl and R" is a hydrogen atom or a hydrocarbyl group) and their mono- and dithio analogs; and the like. Thus, use can be made of such compounds as, for example, phosphorous acid ($H_3PO_3$, sometimes depicted as $H_2(HPO_3)$, and sometimes called ortho-phosphorous acid or phosphonic acid), phosphoric acid ($H_3PO_4$, sometimes called orthophosphoric acid), hypophosphoric acid ($H_4P_2O_6$), metaphosphoric acid ($HPO_3$), pyrophosphoric acid ($H_4P_2O_7$), hypophosphorous acid ($H_3PO_2$, sometimes called phosphinic acid), pyrophosphorous acid ($H_4P_2O_5$, sometimes called pyrophosphonic acid), phosphinous acid ($H_3PO$), tripolyphosphoric acid ($H_5P_3O_{10}$), tetrapolyphosphoric acid ($H_5P_4O_{13}$), trimetaphosphoric acid ($H_3P_3O_9$), phosphorus trioxide, phosphorus tetraoxide, phosphorus pentoxide, and the like. Partial or total sulfur analogs such as phosphorotetrathioic acid ($H_3PS_4$), phosphoromonothioic acid ($H_3PO_3S$), phosphorodithioic acid ($H_3PO_2S_2$), phosphorotrithioic acid ($H_3POS_3$), phosphorus sesquisulfide, phosphorus heptasulfide, and phosphorus pentasulfide ($P_2S_5$, sometimes referred to as $P_4S_{10}$) can also be used in forming dispersants for this disclosure. Also usable, though less preferred, are the inorganic phosphorus halide compounds such as $PCl_3$, $PBr_3$, $POCl_3$, $PSCl_3$, etc.

Likewise use can be made of suchorganic phosphorus compounds as mono-, di-, and triesters of phosphoric acid (e.g., trihydrocarbyl phosphates, dihydrocarbyl monoacid phosphates, monohydrocarbyl diacid phosphates, and mixtures thereof), mono-, di, and triesters of phosphorous acid (e.g., trihydrocarbyl phosphites, dihydrocarbyl hydrogen phosphites, hydrocarbyl diacid phosphites, and mixtures thereof), esters of phosphonic acids (both "primary", RP(O)(OR)$_2$, and "secondary", R$_2$P(O)(OR)), esters of phosphinic acids, phosphonyl halides (e.g., RP(O)Cl$_2$ and R$_2$P(O)Cl), halophosphites (e.g., (RO)PCl$_2$ and (RO)$_2$PCl), halophosphates (e.g., ROP(O)Cl$_2$ and (RO)$_2$P(O)Cl), tertiary pyrophosphate esters (e.g., (RO)$_2$P(O)—O—P(O)(OR)$_2$), and the total or partial sulfur analogs of any of the foregoing organic phosphorus compounds, and the like wherein each hydrocarbyl group contains up to about 100 carbon atoms, preferably up to about 50 carbon atoms, more preferably up to about 24 carbon atoms, and most preferably up to about 12 carbon atoms. Also usable, although less preferred, are the halophosphine halides (e.g., hydrocarbyl phosphorus tetrahalides, dihydrocarbyl phosphorus trihalides, and trihydrocarbyl phosphorus dihalides), and the halophosphines (monohalophosphines and dihalophosphines).

The lubricants herein may include mixtures of one or more boronated and phosphorylated dispersants set forth above combined with non-boronated and non-phosphorylated dispersants as long as the called for dispersant requirements set forth above are still met in the lubricant.

If used, treat rates of the dispersants described above are provided in about 1 to about 15 weight percent and, in other approaches, about 2 to about 13 weight percent, and in yet other approaches, about 4 to about 10 weight percent in the lubricant.

Detergent:

The lubricant composition also includes one or more detergents or mixtures. By one approach, the detergent is a metal containing detergent, such as neutral to overbased detergents. Suitable detergent substrates include phenates, sulfur containing phenates, sulfonates, calixarates, salixarates, salicylates, carboxylic acids, phosphorus acids, mono- and/or di-thiophosphoric acids, alkyl phenols, sulfur coupled alkyl phenol compounds and methylene bridged phenols. Suitable detergents and their methods of preparation are described in greater detail in numerous patent publications, including U.S. Pat. No. 7,732,390, and references cited therein. In one approach, the detergents are neutral to overbased sulfonates, phenates, or carboxylates with an alkali metal or alkaline earth metal salt. The detergents may be linear or branched, such as linear or branched sulfonates. Linear detergents are those that include a straight chain with no side chains attached thereto and typically include carbon atoms bonded only to one or two other carbon atoms. Branched detergents are those with one or more side chains attached to the molecule's backbone and may include carbon atoms bonded to one, two, three, or four other carbon atoms. In one embodiment the sulfonate detergent may be a predominantly linear alkylbenzenesulfonate detergent. In some embodiments the linear alkyl (or hydrocarbyl) group may be attached to the benzene ring anywhere along the linear chain of the alkyl group, but often in the 2, 3, or 4 position of the linear chain, and in some instances predominantly in the 2 position. In other embodiments, the alkyl (or hydrocarbyl) group may be branched, that is, formed from a branched olefin such as propylene or 1-butene or isobutene. Sulfonate detergents having a mixture of linear and branched alkyl groups may also be used.

The detergent substrate may be salted with an alkali or alkaline earth metal such as, but not limited to, calcium, magnesium, potassium, sodium, lithium, barium, or mixtures thereof. In some embodiments, the detergent is free of barium. A suitable detergent may include alkali or alkaline earth metal salts of petroleum sulfonic acids and long chain mono- or di-alkylarylsulfonic acids with the aryl group being one of benzyl, tolyl, and xylyl.

Overbased detergent additives are well known in the art and may be alkali or alkaline earth metal overbased detergent additives. Such detergent additives may be prepared by reacting a metal oxide or metal hydroxide with a substrate and carbon dioxide gas. The substrate is typically an acid, for example, an acid such as an aliphatic substituted sulfonic acid, an aliphatic substituted carboxylic acid, or an aliphatic substituted phenol. In general, the terminology "overbased" relates to metal salts, such as metal salts of sulfonates, carboxylates, and phenates, wherein the amount of metal present exceeds the stoichiometric amount. Such salts may have a conversion level in excess of 100% (i.e., they may comprise more than 100% of the theoretical amount of metal needed to convert the acid to its "normal," "neutral" salt). The expression "metal ratio," often abbreviated as MR, is used to designate the ratio of total chemical equivalents of metal in the overbased salt to chemical equivalents of the metal in a neutral salt according to known chemical reactivity and stoichiometry. In a normal or neutral salt, the metal ratio is one and in an overbased salt, the MR, is greater than one. Such salts are commonly referred to as overbased, hyperbased, or superbased salts and may be salts of organic sulfur acids, carboxylic acids, or phenols. The detergents may also exhibit a total base number (TBN) of about 27 to about 450 and, in other approaches, about 200 to about 400.

If used, the treat rates of the detergent may be about 0.05 weight percent to about 7 weight percent based on the total weight of the lubricant composition.

Friction Modifiers:

The lubricating oil compositions herein may also optionally contain one or more friction modifiers. Suitable friction modifiers may comprise metal containing and metal-free friction modifiers and may include, but are not limited to, imidazolines, amides, amines, succinimides, alkoxylated amities, alkoxylated ether amines, amine oxides, amidoamines, nitriles, betaines, quaternary amines, imines, amine salts, amino guanidines, alkanolamides, phosphonates, metal-containing compounds, glycerol esters, sulfurized fatty compounds and olefins, sunflower oil and other naturally occurring plant or animal oils, dicarboxylic acid esters, esters or partial esters of a polyol and one or more aliphatic or aromatic carboxylic acids, and the like.

Suitable friction modifiers may contain hydrocarbyl groups that are selected from straight chain, branched chain, or aromatic hydrocarbyl groups or mixtures thereof, and may be saturated or unsaturated. The hydrocarbyl groups may be composed of carbon and hydrogen or hetero atoms such as sulfur or oxygen. The hydrocarbyl groups may range from about 12 to about 25 carbon atoms. In an embodiments the friction modifier may be a long chain fatty acid ester. In an embodiment the long chain fatty acid ester may be a mono-ester, or a di-ester, or a (tri)glyceride. The friction modifier may be a long chain fatty amide, a long chain fatty ester, a long chain fatty epoxide derivative, or a long chain imidazoline.

Other suitable friction modifiers may include organic, ashless (metal-free), nitrogen-free organic friction modifiers. Such friction modifiers may include esters formed by reacting carboxylic acids and anhydrides with alkanols and generally include a polar terminal group (e.g. carboxyl or hydroxyl) covalently bonded to an oleophilic hydrocarbon chain. An example of an organic ashless nitrogen-free friction modifier is known generally as glycerol monooleate (GMO) which may contain mono-, di-, and tri-esters of oleic acid. Other suitable friction modifiers are described in U.S. Pat. No. 6,723,685.

Aminic friction modifiers may include amines or polyamines. Such compounds can have hydrocarbyl groups that are linear, either saturated or unsaturated, or a mixture thereof and may contain from about 12 to about 25 carbon atoms. Further examples of suitable friction modifiers include alkoxylated amines and alkoxylated ether amines. Such compounds may have hydrocarbyl groups that are linear, either saturated, unsaturated, or a mixture thereof. They may contain from about 12 to about 25 carbon atoms. Examples include ethoxylated amines and ethoxylated ether amines.

The amines and amides may be used as such or in the form of an adduct or reaction product with a boron compound such as a boric oxide, boron halide, metaborate, boric acid or a mono-, di- or tri-alkyl borate. Other suitable friction modifiers are described in U.S. Pat. No. 6,300,291.

Antioxidants:

The lubricating oil compositions herein also may optionally contain one or more antioxidants. Antioxidant compounds are known and include, for example, phenates, phenate sulfides, sulfurized olefins, phosphosulfurized terpenes, sulfurized esters, aromatic amines, alkylated diphenylamines (e.g., nonyl diphenylamine, di-nonyl diphenylamine, octyl diphenylamine, di-octyl diphenylamine), phenyl-alpha-naphthylamines, alkylated phenyl-alpha-naphthylamines, hindered non-aromatic amines, phenols, hindered phenols, oil-soluble molybdenum compounds, macromolecular antioxidants, or mixtures thereof. Antioxidants may be used alone or in combination.

Corrosion Inhibitors:

The automatic transmission lubricants may further include additional corrosion inhibitors (it should be noted that some of the other mentioned components may also have copper corrosion inhibition properties). Suitable additional inhibitors of copper corrosion include ether amines, polyethoxylated compounds such as ethoxylated amines and ethoxylated alcohols, imnidazolines, monoalkyl and dialkyl thiadiazole, and the like.

Thiazoles, triazoles and thiadiazoles may also be used in the lubricants. Examples include benzotriazole; tolyltriazole; octyltriazole; decyltriazole; dodecyltriazole; 2-mercaptobenzotriiazole; 2,5-dimercapto-1,3,4-thiadiazole; 2-mercapto-5-hydrocarbylthio-1,3,4-thiadiazoles; and 2-mercapto-5-hydrocarbylthio-1,3,4-thiadiazoles. The preferred compounds are the 1,3,4-thiadiazoles, especially the 2-hydrocarbyldithio-5-mercapto-1,3,4-dithiadiazoles, a number of which are available as articles of commerce.

Foam Inhibitors/Anti Foam Agents: Anti-foam/Surfactant agents may also be included in a fluid according to the present disclosure. Various agents are known for such use. Especially preferred are copolymers of ethyl acrylate and hexyl ethyl acrylate, such as PC-1244, available from Solutia. Preferred are silicone fluids, such as 4% DCF. Mixtures of anti-foam agents are especially preferred.

Seal-Swell Agents:

The automatic transmission fluids of the present disclosure may further include seal swell agents. Seal swell agents such as esters, adipates, sebacates, azealates, phthalates, sulfones, alcohols, alkyibenzenes, substituted sulfolanes, aromatics, or mineral oils cause swelling of elastomeric materials used as seals in engines and automatic transmissions.

Alcohol-type seal swell agents are generally low volatility linear alkyl alcohols, such as decyl alcohol, tridecyl alcohol and tetradecyl alcohol. Alkylbenzenes useful as seal swell agents include dodecylbenzenes, tetradecylbenzenes, dinonyl-benzenes, di(2-ethylhexyl)benzene, and the like. Substituted sulfolanes (e.g. those described in U.S. Pat. No. 4,029,588, incorporated herein by reference) are likewise useful as seal swell agents in compositions according to the present invention. Mineral oils useful as seal swell agents in the present disclosure include low viscosity mineral oils with high naphthenic or aromatic content. Aromatic seal swell agents include the commercially available Exxon Aromatic 200 ND seal swell agent. Commercially available examples of mineral oil seal swell agents include Exxon® Necton®-37 (FN 1380) and Exxon® Mineral Seal Oil (FN 3200).

Anti-Rust Agents:

Various known anti-rust agents or additives are known for use in transmission fluids, and are suitable for use in the fluids according to the present disclosure. Especially preferred are alkyl polyoxyalkylene ethers, such as Mazawet® 77, C-8 acids such as Neofat® 8, oxyalkyl amines such as Tomah PA-14, 3-decyloxypropylamine, and polyoxypropylene-polyoxyethylene block copolymers such as Pluronic® L-81.

Extreme Pressure Agents:

The lubricating oil compositions herein also may optionally contain one or more extreme pressure agents. Extreme Pressure (EP) agents that are soluble in the oil include sulfur- and chlorosulfur-containing EP agents, chlorinated hydrocarbon EP agents and phosphorus EP agents. Examples of such EP agents include chlorinated waxes; organic sulfides and polysulfides such as dibenzyldisulfide, bis(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbyl and trihydrocarbyl phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenyl phosphite; metal thiocarbamates such as zinc dioctyldithiocarbamate and barium heptylphenol diacid; amine salts of alkyl and dialkylphosphoric acids, including, for example, the amine salt of the reaction product of a dialkyldithiophosphoric acid with propylene oxide; and mixtures thereof.

Anti-Wear Agents:

The lubricating oil compositions herein also may optionally contain one or more anti-wear agents. Examples of suitable antiwear agents include, but are not limited to, a metal thiophosphate; a metal dialkyldithiophosphate; a phosphoric acid ester or salt thereof; a phosphate ester(s); a phosphite; a phosphorus-containing carboxylic ester, ether, or amide; a sulfurized olefin; thiocarbamate-containing compounds including, thiocarbamate esters, alkylene-coupled thiocarbamates, and bis(S-alkyldithiocarbamyl) disulfides; and mixtures thereof. A suitable antiwear agent may be a molybdenum dithiocarbamate. The phosphorus containing antiwear agents are more fully described in European Patent 612 839. The metal in the dialkyl dithio phosphate salts may be an alkali metal, alkaline earth metal, aluminum, lead, tin, molybdenum, manganese, nickel, copper, titanium, or zinc. A useful antiwear agent may be zinc dialkyldithiophosphate.

Further examples of suitable antiwear agents include titanium compounds, tartrates, tartrimides, oil soluble amine salts of phosphorus compounds, sulfurized olefins, phosphites (such as dibutyl phosphite), phosphonates, thiocarbamate-containing compounds, such as thiocarbamate esters, thiocarbamate amides, thiocarbamic ethers, alkylene-coupled thiocarbamates, and bis(S-alkyldithiocarbamyl) disulfides. The tartrate or tartrimide may contain alkyl-ester groups, where the sum of carbon atoms on the alkyl groups may be at least 8. The antiwear agent may in one embodiment include a citrate.

The antiwear agent may be present in ranges including about 0 wt % to about 15 wt %, in other approaches, about 0.01 wt % to about 10 wt %, in yet other approaches, about 0.05 wt % to about 5 wt %, or, in further approaches, about 0.1 wt % to about 3 wt % of the lubricating oil composition.

As used herein the term "viscosity index" is an arbitrary measure for the change of viscosity with variations in temperature. The viscosity index can be calculated using the formula: VI=100*[(L−U)/(L−H)], where L=kinematic viscosity at 40° C. of an oil of 0 viscosity index having the same kinematic viscosity at 100° C. as the oil whose viscosity index is to be calculated, mm$^2$/s (cSt);

H=kinematic viscosity at 40° C. of an oil of 100 viscosity index having the same kinematic viscosity at 100° C. as the oil whose viscosity index is to be calculated mm$^2$/s (cSt); and U=kinematic viscosity at 40° C. of the oil whose viscosity index is to be calculated mm$^2$/s (cSt).

As measured herein, the conditions for measuring KV100 is using an approximately 2.3 cSt group 3 base oil (UltraS2) with about 7.7 weight percent DI package and a targeted KV100 of about 6 cSt after addition of the PMA VII polymer.

As used herein, the term "treat rate" refers to the weight percent of a component in the lubricant oil. For example, the treat rate of a specific polymer in an oil composition is the weight percent of the polymer in the composition: treat rate=(weight of the polymer in an oil free basis)/(weight of the entire composition)×100%. As mentioned above, treat rate of the polymers herein refers to the solids of the polymer absent any oil or carrier fluid used during its polymerization.

As used herein, the term "polydispersity index" is synonymous with the term "dispersity" and is equal to the (weight average molecular weight)/(number average molecular weight)

Based on the above discussion, exemplary ranges of various lubricating composition components are set forth in Table 1 below.

TABLE 1

Lubricant Composition

| Component | Example Ranges, Weight Percent | Additional Example Ranges, Weight Percent |
| --- | --- | --- |
| (Meth)acrylate polymer VII | 1 to 10 | 3 to 6 |
| Dispersants | 4.5 to 25 | 4.5 to 12 |
| Detergents | 0.1 to 15 | 0.8 to 10 |
| Friction Modifiers | 0 to 6 | 0.005 to 4 |
| Antioxidants | 0 to 2 | 0.05 to 1 |
| Rust Inhibitors | 0 to 1 | 0.005 to 0.5 |
| Corrosion Inhibitors | 0 to 1.2 | 0.005 to 0.8 |
| Anti-wear Agents | 0 to 5 | 0 to 3 |
| Seal Swell Agents | 0 to 20 | 0 to 10 |
| Antifoam Agents | 0 to 1 | 0.005 to 0.8 |
| Extreme Pressure Agents | 0 to 2 | 0 to 1 |
| Base Oils | Balance | Balance |

The viscosity index improvers described herein are particularly suited for lubricants designed for automobiles, such as driveline fluids, engine oils, and/or automatic transmission fluid. In some approaches, suitable automatic transmissions may include a wet friction clutch transmission and typically have a plurality of clutch plates (may be at least three and may be up to six), such as those with a cellulose based friction lining and each having an associated steel reaction plate packed together in a housing between an application piston and a release spring. Such transmission may also include other common components such as a waved or cushion plates, spacer plates, and/or retention rings. The wet friction clutch is operated in a conventional manner by the selected application of fluid pressure using the lubricating transmission fluid and viscosity index improvers described herein.

A better understanding of the present disclosure and its many advantages may be clarified with the following examples. The following examples are illustrative and not limiting thereof in either scope or spirit. Those skilled in the art will readily understand that variations of the components, methods, steps, and devices described in these examples can be used. Unless noted otherwise, all percentages, ratios, and parts noted in this disclosure are by weight.

EXAMPLES

Materials and Methods

Lauryl (meth)acrylate (LMA), Methyl (meth)acrylate (MMA), n-Butyl (meth)acrylate (n-BMA), and Cetyl-eicosyl (meth)acrylate (CEMA) in the Examples below are from Evonik Oil Additives USA. 2-hydroxyethyl (meth)acrylate (HEMA) in the Examples is from Sigma Aldrich.

In the examples below, Vazo™ 67 (2.2'-Azobis(2-methylbutyronitrile)) from Chemours was used as polymerization initiator. Base oil used for polymerization reaction was 80N ConocoPhillips group 2 base oil (KV100 is about 3.0 cSt). The base oil used for blend study was 2ULTRAS (PHILLIPS66 group 3 base oil).

bonyl) sulfanyl] pentanoic acid, via the RAFT pathway. The resulting poly(meth)acrylate (PMA) polymer product is provided in the scheme above, wherein a, b, c, d, and e indicate the relative abundance of each monomer in the final PMA product based on the relative concentrations of the monomers in the original reaction mixture. In the present disclosure, c and e can be zero. Optionally, a dispersant monomer, such as dimethylamino propyl methacrylamide, may also be added.

Example 1

This Example illustrates the formation of a poly(meth) acrylate polymer according to the present disclosure using either FRP or RAFT polymerization procedures. PMAs with linear random copolymers were synthesized with molar ratios according to Table 2, by either conventional free radical polymerization (FRP) or reversible addition-fragmentation chain transfer (RAFT) polymerization.

Scheme 1: General procedure for PMA synthesis via the free radical polmerization (FRP) pathway and the reversible addition-fragmentation chain transfer (RAFT) pathway.

Final PMA Polymer

In the general scheme above, the monomers are reacted together in a solvent (e.g. 80N Conoco Phillips group 2 base oil) at an elevated temperature (e.g. 80-85° C.) with an initiator as noted above and using 1) a chain transfer agent, such as dodecyl mercaptane, via the FRP pathway, or 2) a RAFT agent, such as 4-cyano-4-[(dodecylsulfanylthiocar- FRP Procedure:

PMAs by FRP were typically synthesized by the following general procedure, wherein the amounts of the reactants are given by Table 2:

Appropriate amounts of MMA, LMA, n-BMA, HEMA, and CEMA were charged in a glass reactor. An amount of conventional chain transfer agent, e.g. n-dodecanethiol, equaling from 0 to about 0.05 wt %, and 80N base oil were further charged in the reactor, and the reactor was equipped with a nitrogen inlet flowing at 0.3 SCFH, medium speed mechanical stirrer, a thermocouple and a water-cooled condenser. The reaction mixture was then stirred under $N_2$ for 30 minutes to ensure mixing, and the mixture was then heated to 83° C., and 2,2'-Azobis(2-methylbutyronitrile) was added and then stirred for 4 hours at the same temperature. After sample analysis to ensure completion, additional oil was added as necessary to create a homogeneous mixture. Molecular weight of the resulting polymer product was measured by gel permeation chromatography (GPC) with RI detector using poly(methyl methacrylate) as the calibration reference. The results obtained for weight average molecular weight (Mw) and the polydispersity are shown in Table 4. Synthesized PMAs were blended in 2 ultra base oil with same treat rate of relevant DI package and analyzed for PMAs' performance.

RAFT Procedure:

PMAs by RAFT polymerization were synthesized by following the same procedures as described above for FRP, with the exception that the conventional chain transfer agent was replaced by from 0 to about 0.15 wt % of a RAFT agent, e.g. 4-cyano-4-[(dodecylsulfanylthiocarbonyl)sulfanyl] pentanoic acid.

Example 2

In Table 2 below, data for 19 representative PMA samples of the present disclosure synthesized according to Example 1 are provided and compared to a prior art polymer. The values corresponding to the monomers LMA, MMA, HEMA, n-BMA, and CEMA in Table 2 are expressed in mole percent. PMA samples 2, 5, 7, 9, 14, 16, and 19 were synthesized by free radical polymerization (FRP), and PMA samples 1, 3, 4, 6, 8, 10-13, 15, 17, and 18 were synthesized using reversible addition-fragmentation chain transfer (RAFT) polymerization.

Table 3 below provides various select relationships and ratios of the monomers discovered herein for preparing a polymer, for instance, having a high viscosity index value and suitable for use in a lubricant oil composition. The table includes an alkyl ratio, which is a ratio of the sum of the mole percent of the LMA and CEMA monomers divided by the mole percent of the MMA and n-BMA monomers. The (meth)acrylate ratio is a ratio of the sum of the mole percent of the LMA and MMA monomer divided by the mole percent of the HEMA monomer. These ratios are also illustrated in FIGS. 1 and 2 relative to the lubricant's viscosity index. Table 4 provides characteristics of the formed polymers including weight average molecular weight and polydispersity index, and Table 5 provides characteristics of the formed lubricant.

TABLE 3

Monomer Relationships

| Sample ID | Alkyl Ratio (LMA + CEMA)/ (MMA + nBMA) | (meth)acrylate Ratio (LMA + MMA)/ HEMA |
|---|---|---|
| Comparative PMA | 4.17 | 13.5 |
| PMA 1 | 3.50 | 9.0 |
| PMA 2 | 2.80 | 18.0 |
| PMA 3 | 2.00 | 8.0 |
| PMA 4 | 2.08 | 10.3 |
| PMA 5 | 3.75 | 18.0 |
| PMA 6 | 2.00 | 7.5 |
| PMA 7 | 2.17 | 18.0 |
| PMA 8 | 2.17 | 16.0 |
| PMA 9 | 3.20 | 10.5 |
| PMA 10 | 2.80 | 19.0 |
| PMA 11 | 3.50 | 9.0 |
| PMA 12 | 3.50 | 8.5 |
| PMA 13 | 3.38 | 11.0 |
| PMA 14 | 3.50 | 9.0 |
| PMA 15 | 2.80 | 19.0 |
| PMA 16 | 3.38 | 11.0 |
| PMA 17 | 3.50 | 9.0 |

TABLE 2

Polymerization Conditions

| Sample ID | RAFT Agent (wt %) | Chain Transfer Agent $C_{12}H_{25}S$ (wt %) | LMA (mole %) | MMA (mole %) | HEMA (mole %) | n-BMA (mole %) | CEMA (mole %) |
|---|---|---|---|---|---|---|---|
| Comparative PMA[a] | — | 0.29 | 75.1 | 18 | 6.9 | — | — |
| PMA 1 | 0.15 | — | 70 | 20.0 | 10 | — | — |
| PMA 2 | — | 0.04 | 65 | 25 | 5 | — | 5 |
| PMA 3 | 0.1 | — | 60 | 20 | 10 | 10 | — |
| PMA 4 | 0.1 | — | 57.5 | 20 | 7.5 | 10 | 5 |
| PMA 5 | — | 0.04 | 70 | 20 | 5 | — | 5 |
| PMA 6 | 0.1 | — | 55 | 20 | 10 | 10 | 5 |
| PMA 7 | — | 0.04 | 60 | 30 | 5 | — | 5 |
| PMA 8 | 0.1 | — | 60 | 20 | 5 | 10 | 5 |
| PMA 9 | — | 0.04 | 66.5 | 21.8 | 8.4 | — | 3.3 |
| PMA 10 | 0.1 | — | 70 | 25.0 | 5 | — | — |
| PMA 11 | 0.1 | — | 70 | 20 | 10 | — | — |
| PMA 12 | 0.05 | — | 65 | 20 | 10 | — | 5 |
| PMA 13 | 0.04 | — | 62.5 | 20 | 7.5 | — | 5 |
| PMA 14 | — | 0.03 | 70 | 20 | 10 | — | — |
| PMA 15 | 0.05 | — | 70 | 25 | 5 | — | — |
| PMA 16 | — | 0.03 | 62.5 | 20 | 7.5 | — | 5 |
| PMA 17 | 0.05 | — | 70 | 20 | 10 | — | — |
| PMA 18 | 0.03 | — | 70 | 20 | 10 | — | — |
| PMA 19 | 0 | 0 | 70 | 20 | 10 | — | — |

[a]The Comparative PMA is a polymer described in EP 0569639

TABLE 3-continued

Monomer Relationships

| Sample ID | Alkyl Ratio (LMA + CEMA)/ (MMA + nBMA) | (meth)acrylate Ratio (LMA + MMA)/ HEMA |
|---|---|---|
| PMA 18 | 3.50 | 9.0 |
| PMA 19 | 3.50 | 9.0 |

TABLE 4

Polymer Characteristics

| Sample ID | MW (kg/mol)[c] | PDI[d] |
|---|---|---|
| Comparative PMA | 127.4 | 2.14 |
| PMA 1 | 134.0 | 1.55 |
| PMA 2 | 138.1 | 2.18 |
| PMA 3 | 148.9 | 1.70 |
| PMA 4 | 149.9 | 1.81 |
| PMA 5 | 150.9 | 2.24 |
| PMA 6 | 152.1 | 1.83 |
| PMA 7 | 159.1 | 2.33 |
| PMA 8 | 159.3 | 1.75 |
| PMA 9 | 165.1 | 2.36 |
| PMA 10 | 183.1 | 1.71 |
| PMA 11 | 186.5 | 1.86 |
| PMA 12 | 243.5 | 1.89 |
| PMA 13 | 250.0 | 2.35 |
| PMA 14 | 289 | 3.46 |
| PMA 15 | 290 | 2.41 |
| PMA 16 | 293.2 | 2.72 |
| PMA 17 | 301 | 2.18 |
| PMA 18 | 336.6 | 2.17 |
| PMA 19 | 398.6 | 3.36 |

[c]Weight Average Molecular Weight weight
[d]Polydispersity Index: (weight average molecular)/(number average molecular weight)

TABLE 5

Lubricant oil Composition Properties

| Sample ID | Polymer (wt %)[e] | KV100[f] (cSt) | KV40[g] (cSt) | VI[h] | BF-40[i] (cP) | KRL (20H)[j] | Delta cSt[k] | Thickening Power[L] |
|---|---|---|---|---|---|---|---|---|
| Comparative PMA | 5.9 | 5.98 | 20.24 | 274.8 | 1950 | 23.3 | 3.28 | 0.55 |
| PMA 1 | 5.6 | 5.98 | 19.98 | 280.2 | 2260 | — | 3.28 | 0.59 |
| PMA 2 | 5.56 | 5.99 | 19.98 | 281.0 | 2809 | — | 3.29 | 0.59 |
| PMA 3 | 5.6 | 6.09 | 20.05 | 287.3 | 2190 | — | 3.39 | 0.61 |
| PMA 4 | 5.3 | 6.02 | 19.89 | 284.9 | 1990 | — | 3.32 | 0.62 |
| PMA 5 | 5.20 | 6.01 | 20.12 | 279.6 | 3719 | — | 3.31 | 0.64 |
| PMA 6 | 5.6 | 6.08 | 20.08 | 285.9 | 2389 | — | 3.38 | 0.60 |
| PMA 7 | 5.32 | 6.02 | 19.69 | 289.2 | 2180 | — | 3.32 | 0.62 |
| PMA 8 | 4.88 | 5.91 | 19.64 | 281.2 | 2010 | — | 3.21 | 0.66 |
| PMA 9 | 5.4 | 5.96 | 19.77 | 282.9 | 2130 | 24.9 | 3.26 | 0.61 |
| PMA 10 | 4.60 | 6.01 | 19.67 | 288.8 | 1940 | — | 3.31 | 0.72 |
| PMA 11 | 4.8 | 5.93 | 19.44 | 287.9 | 1880 | 25.7 | 3.23 | 0.67 |
| PMA 12 | 4.22 | 6.01 | 19.54 | 291.5 | 2599 | — | 3.31 | 0.78 |
| PMA 13 | 4.0 | 5.89 | 18.86 | 297.5 | 2000 | — | 3.19 | 0.80 |
| PMA 14 | 4.28 | 6.06 | 19.23 | 303.1 | 1770 | — | 3.36 | 0.79 |
| PMA 15 | 3.5 | 5.96 | 18.97 | 300.5 | 1590 | 33.5 | 3.26 | 0.93 |
| PMA 16 | 4.0 | 6.07 | 19.27 | 303.1 | 2719 | — | 3.37 | 0.84 |
| PMA 17 | 3.7 | 5.99 | 19.06 | 301.2 | 1660 | — | 3.29 | 0.88 |
| PMA 18 | 3.36 | 5.92 | 18.69 | 304 | 1610 | — | 3.22 | 0.96 |
| PMA 19 | 3.50 | 5.86 | 18.66 | 299.6 | 1710 | 31.3 | 3.16 | 0.90 |

[e](Weight of the polymer in a sample of diluent oil)/(the weight of the entire sample) × 100
[f]Kinematic Viscosity at 100° C.
[g]Kinematic Viscosity at 40° C.
[h]Viscosity Index
[i]Brookfield viscosity measured at −40° C.
[j]Kluber Lubrication Shear Stability or KRL tapered bearing shear loss by method CEC L-45 measuring the percent viscosity loss of the original viscosity at 100° C. after performing the 20 hour test.
[k]Delta centistokes is the (Measured KV100)−(KV100 of base oil and DI package combination of about 2.7)
[L]Thickening Power is (Delta cSt) divided by polymer treat rate. A higher thickening power means the polymer thickens the base oil more with a lower treat rate.

It is to be understood that while the polymer and lubricant of this disclosure have been described in conjunction with the detailed description thereof and summary herein, the foregoing description is intended to illustrate and not limit the scope of the disclosure, which is defined by the scope of the appended claims. Other aspects, advantages, and modifications are within the scope of the claims.

What is claimed is:

1. A polymer suitable for a viscosity modifier in lubricating oil compositions, the polymer comprising:
    about 88 to about 96 mole percent of alkyl (meth)acrylate monomer units including at least short chain alkyl (meth)acrylate monomer units with an alkyl chain length of 1 to 4 carbons and long chain alkyl (meth) acrylate monomer units with an alkyl chain length of 12 to 20 carbons, wherein an alkyl molar ratio of the long chain alkyl (meth)acrylate monomer units to the short chain alkyl (meth)acrylate monomer units is greater than 2.0 and less than 5.5;
    about 1 to about 6 mole percent of 2-hydroxyethyl (meth) acrylate monomer units; and
    a weight average molecular weight of about 100 kg/mol to about 500 kg/mol.

2. The polymer of claim 1, wherein the polymer includes about 15 to about 30 mole percent of the short chain alkyl (meth)acrylate monomer units and about 58 to about 81 mole percent of the long chain alkyl (meth)acrylate monomer units.

3. The polymer of claim 1, wherein the alkyl (meth) acrylate monomer units include both methyl (meth)acrylate and lauryl (meth)acrylate and wherein the polymer includes up to about 95 mole percent of the methyl (meth)acrylate and the lauryl (meth)acrylate combined.

4. The polymer of claim 3, wherein the (meth)acrylate ratio of the sum of the mole percent of the methyl (meth)

acrylate monomer units and the lauryl (meth)acrylate monomer units to the mole percent of the 2-hydroxyethyl (meth)acrylate monomer units is greater than about 14.

5. The polymer of claim 4, wherein the (meth)acrylate ratio is about 16 to about 20 and the polymer has a viscosity index of about 280 or greater.

6. The polymer of claim 1, wherein the polymer comprises about 5 to about 6 mole percent of the 2-hydroxyethyl (meth)acrylate monomer units.

7. The polymer of claim 3, wherein the alkyl (meth)acrylate monomer units further include one or more of butyl (meth)acrylate monomer units or longer chain alkyl (meth)acrylate monomer units having an alkyl chain length of 16 to 20 carbons and wherein the polymer includes no more than 15 mole percent of the butyl (meth)acrylate and no more than about 7.5 mole percent of the alkyl (meth)acrylate having an average alkyl chain length of 16 to 20 carbons.

8. The polymer of claim 1, wherein the polymer is free of alkyl (meth)acrylate monomer units with alkyl chain lengths from 5 to 9 carbons.

9. The polymer of claim 1, wherein the polymer has a weight average molecular weight of at least about 150 kg/mole.

10. The polymer of claim 1, wherein the polymer has a weight average molecular weight of at least about 200 kg/mole.

11. The polymer of claim 1, wherein the polymer includes about 15 to about 30 mole percent of methyl (meth)acrylate, about 60 to about 75 mole percent of lauryl (meth)acrylate, about 0 to about 15 mole percent of butyl (meth)acrylate, about 0 to about 7.5 mole percent of longer chain alkyl (meth)acrylate having an alkyl chain length of 16 to 20 carbons; and about 0 to about 7.5 mole percent of dispersant monomer units.

12. The polymer of claim 1, further comprising a polydispersity index of about 1.5 to about 4.0.

13. A lubricant oil composition comprising:
greater than 50% by weight of a base oil;
about 1 to about 7.5 weight percent of a viscosity index improver including a (meth)acrylate polymer having as polymerized monomer units thereof about 88 to about 96 mole percent of alkyl (meth)acrylate monomer units including both short chain alkyl (meth)acrylate monomer units having an alkyl chain length of 1 to 4 carbons and long chain alkyl (meth)acrylate monomer units having an alkyl chain length of 12 to 20 carbons, and about 1 to about 6 mole percent of 2-hydroxyethyl (meth)acrylate monomer units;
wherein an alkyl molar ratio of the long chain alkyl (meth)acrylate monomer units to the short chain alkyl (meth)acrylate monomer units is greater than 2.0 and less than 5.5; and
wherein the (meth)acrylate polymer has a weight average molecular weight of about 100 kg/mol to about 500 kg/mol.

14. The lubricant oil composition of claim 13, wherein the (meth)acrylate polymer includes about 15 to about 30 mole percent of the short chain alkyl (meth)acrylate monomer units and about 58 to about 81 of the long chain alkyl (meth)acrylate monomer units.

15. The lubricant oil composition of claim 14, wherein the alkyl (meth)acrylate monomer units include both methyl (meth)acrylate monomer units and lauryl (meth)acrylate monomer units and wherein the (meth)acrylate polymer includes up to about 95 mole percent of the methyl (meth)acrylate and the lauryl (meth)acrylate monomer units combined.

16. The lubricant oil composition of claim 15, wherein the (meth)acrylate ratio of the sum of the mole percent of the methyl (meth)acrylate monomer units and the lauryl (meth)acrylate monomer units to the mole percent of the 2-hydroxyethyl (meth)acrylate monomer units is greater than about 14.

17. The lubricant oil composition of claim 16, wherein the molar (meth)acrylate ratio is greater than 14 to about 20 and the polymer (meth)acrylate has a viscosity index of about 280 or greater.

18. The lubricant oil composition of claim 13, wherein the (meth)acrylate polymer includes about 5 to about 6 mole percent of the 2-hydroxyethyl (meth)acrylate monomer units.

19. The lubricant oil composition of claim 13, wherein the alkyl (meth)acrylate monomer units further includes one or more of butyl (meth)acrylate monomer units and longer chain alkyl (meth)acrylate monomer units having an alkyl chain length of 16 to 20 carbons and wherein the (meth)acrylate polymer includes no more than 15 mole percent of the butyl (meth)acrylate monomer units and no more than about 7.5 mole percent of the longer chain alkyl (meth)acrylate monomer units having an alkyl chain length of 16 to 20 carbons.

20. The lubricant oil composition of claim 13, wherein the (meth)acrylate polymer includes about 15 to about 30 mole percent of methyl (meth)acrylate, about 60 to about 75 mole percent of lauryl (meth)acrylate, about 0 to about 15 mole percent of butyl (meth)acrylate, about 0 to about 7.5 mole percent of longer chain alkyl (meth)acrylate having an alkyl chain length of 16 to 20 carbons; and about 0 to about 7.5 mole percent of dispersant monomer units.

21. The lubricant oil composition of claim 13, wherein the polymer is free of alkyl (meth)acrylate monomer units with an alkyl chain length from 5 to 9 carbons.

22. The lubricant oil composition of claim 13, wherein the polymer has a weight average molecular weight of at least about 150 kg/mole.

23. The lubricant oil composition of claim 13, wherein the polymer has a weight average molecular weight of at least about 200 kg/mole.

24. The lubricant oil composition of claim 13, wherein the (meth)acrylate polymer has a polydispersity index of about 1.5 to about 4.

* * * * *